United States Patent
Piry et al.

(10) Patent No.: US 7,587,556 B2
(45) Date of Patent: Sep. 8, 2009

(54) STORE BUFFER CAPABLE OF MAINTAINING ASSOCIATED CACHE INFORMATION

(75) Inventors: Frederic Claude Piry, Fleuris (FR); Philippe Jean-Pierre Raphalen, Valbonne (FR); Florent Begon, Antibes (FR); Gilles Eric Grandou, Benoit (FR)

(73) Assignee: ARM Limited, Cambridge (GB)

( * ) Notice: Subject to any disclaimer, the term of this patent is extended or adjusted under 35 U.S.C. 154(b) by 313 days.

(21) Appl. No.: 11/391,689

(22) Filed: Mar. 29, 2006

(65) Prior Publication Data

US 2007/0233962 A1    Oct. 4, 2007

(51) Int. Cl.
   *G06F 13/00* (2006.01)
   *G06F 13/28* (2006.01)
(52) U.S. Cl. ..................... 711/141; 711/128
(58) Field of Classification Search .......... None
   See application file for complete search history.

(56) References Cited

U.S. PATENT DOCUMENTS

2003/0225980 A1*  12/2003  Henry et al. .......... 711/144

* cited by examiner

*Primary Examiner*—Kevin Verbrugge
*Assistant Examiner*—Eric S Cardwell
(74) *Attorney, Agent, or Firm*—Nixon & Vanderhye P.C.

(57) ABSTRACT

A store buffer, method and data processing apparatus is disclosed. The store buffer comprises: reception logic operable to receive a request to write a data value to an address in memory; buffer logic having a plurality of entries, each entry being selectively operable to store request information indicative of a previous request and to maintain associated cache information indicating whether a cache line in a cache is currently allocated for writing data values to an address associated with that request; and entry selection logic operable to determine which one of the plurality entries to allocate to store the request using the request information and the associated cache information of the plurality of entries to determine whether a cache line in the cache is currently allocated for writing the data value to the address in memory. By reviewing the entries in the buffer logic and identifying which entry to store the request based on information currently stored by the buffer logic, the need to obtain cache information indicating whether any cache line in a cache is currently allocated for writing the data value may be obviated. In turn, the need to perform a cache look up to obtain the cache information may also be obviated. It will be appreciated that by obviating the need to perform a cache lookup, the power consumption of the store buffer may be reduced. Also, the amount of cache bandwidth consumed by performing unnecessary cache lookups may also be reduced, thereby significantly improving the performance of the cache.

22 Claims, 4 Drawing Sheets

STORE BUFFER CAPABLE OF MAINTAINING ASSOCIATED CACHE INFORMATION

FIELD OF THE INVENTION

The present invention relates to a store buffer.

DESCRIPTION OF THE PRIOR ART

Store buffers are known. Store buffers are used in a data processing apparatus to temporarily store data values which a processor core has requested be written to memory.

Writing data values to memory can often take a relatively large amount of time and so a store buffer is provided which enables the processor core to relinquish the data values to be written and to continue with further processing operations, despite the fact that those data values have not yet been written to memory. The store buffer therefore effectively decouples the processor core from the process of writing of the data values to memory and enables the processor core to continue with other operations.

However, whilst providing a store buffer enables the processor core to operate at optimal performance levels, a problem with such store buffers is that their power consumption can be relatively high. This problem becomes particularly acute in low-power applications where there is a finite amount of energy available, such as with battery-powered applications, and the power consumption of the store buffer reduces the battery life.

Accordingly, it is desired to provide an improved arrangement which provides for a reduced power consumption.

SUMMARY OF THE INVENTION

Viewed from a first aspect, the present invention provides a store buffer comprising: reception logic operable to receive a request to write a data value to an address in memory; buffer logic having a plurality of entries, each entry being selectively operable to store request information indicative of a previous request and to maintain associated cache information indicating whether a cache line in a cache is currently allocated for writing data values to an address associated with that request; and entry selection logic operable to determine which one of said plurality entries to allocate to store said request using the request information and the associated cache information of the plurality of entries to determine whether a cache line in said cache is currently allocated for writing said data value to said address in memory.

The present invention recognises that in typical existing store buffers the number of entries is kept relatively low in order to reduce complexity and chip area and to increase speed. Hence, each entry is cleared or invalidated as soon as possible in order to free that entry to be available to store any further write requests and to prevent the processor core from stalling because there is no available entry in the store buffer into which that further write request can be stored. Accordingly, as soon as a write request stored in an entry in the store buffer has been dealt with by the store buffer, that entry will be cleared or invalidated.

However, the present invention also recognises that because the entries are cleared once each request is completed, the cache attribute information for each write request needs to be determined for each time for each write request. In order to obtain the cache attribute information a cache lookup will typically need to be performed for each write request. Performing a cache lookup both takes time and consumes power. Also, performing the cache lookup consumes cache bandwidth which may impact on the overall performance of the cache.

Accordingly, reception logic is provided which receives each write request. Buffer logic is also provided which has a number of entries. Each of the entries is selectable to store information representative of the request. Each entry is also able to store information which indicates whether any cache line in the cache is currently allocated to store the data value of the write request. Entry selection logic is provided which reviews the request information and cache information from each of the entries in the buffer logic and determines from this information which of the entries should be used to store the request.

By reviewing the entries in the buffer logic and identifying which entry to store the request based on information currently stored by the buffer logic, the need to obtain cache information indicating whether any cache line in a cache is currently allocated for writing the data value may be obviated. In turn, the need to perform a cache lookup to obtain the cache information may also be obviated. It will be appreciated that by obviating the need to perform a cache lookup, the power consumption of the store buffer may be reduced. Also, the amount of cache bandwidth consumed by performing unnecessary cache lookups may also be reduced, thereby significantly improving the performance of the cache.

In one embodiment, the associated cache information comprises an address indicative of the cache line currently allocated in the cache.

Hence, each entry in the buffer provide an indication of the address of a cache line currently allocated. Accordingly, the address of the request can be reviewed against the addresses stored within the buffer to determine which of the entries to allocate to store the request.

In one embodiment, the cache comprises an "n"-way set-associative cache, where "n" is an integer greater than 1, and the associated cache information further comprises an indication of which of the "n"-ways is currently allocated for writing the data value.

Accordingly, the buffer logic stores in each entry an indication of the way which is currently allocated for storing the data value.

In one embodiment, each entry is further operable to store data valid information indicating whether the data value for that entry has been written to the cache.

Accordingly, an indication is provided showing whether or not the data value of that entry has yet been written to the cache.

In one embodiment, the entry selection logic is operable to determine whether the associated cache information stored in any of the plurality of entries indicates that a cache line in one of the "n"-ways is currently allocated for writing the data value and to determine whether the data valid information for that entry indicates that the data value for that entry has been written to the cache and, if so, to allocate that entry to store the request information.

Accordingly, when a request to write a data value to the memory is received, the cache information stored in each of the entries is reviewed to determine whether a cache line in any one of the ways which stores that data value has been allocated. In the event that it is determined that a cache line is currently allocated for storing that data value, then a determination is made of whether the data value associated with that entry has yet been written to the cache. If the indication shows that the data value has been written to the cache, then that data value may be overwritten with the new data value in the store buffer and the indication of the cache line in one of the ways is retained.

Hence, it can be seen that when a request is received to write a data value, a cache lookup to determine whether a cache line is currently allocated for storing that data value is not required in the event that the store buffer indicates that a cache line is currently allocated. It will be appreciated that this can significantly reduce power consumption by reducing the number of cache lookups required. Also, by reducing the number of cache lookups the available cache bandwidth is increased.

In one embodiment, the buffer logic is operable to retain the associated cache information stored in each of the plurality of entries indicating that a cache line in one of the "n"-ways is currently allocated for writing data values even when the data valid information has been set to indicate that the data value for that entry has been written to the cache.

Accordingly, instead of clearing the entry in the buffer logic when a data value has been written to the cache, the buffer logic maintains the associated cache information in the buffer logic. By maintaining this in the buffer logic the information may be reused in the event that another data value falling within that cache line is written to the store buffer. Reusing the information can help to save power.

In one embodiment, the store buffer further comprises hazard detection logic operable to determine whether the associated cache information stored in each of the plurality of entries indicates that a cache line in one of the "n"-ways is currently allocated for writing data values remains valid and, if not, to invalidate the associated cache information stored in that entry to indicate that a cache line in one of the "n"-ways is not currently allocated for writing data values.

Providing hazard logic ensures that any data currently maintained in the store buffer remains valid and correctly indicates whether and which of the ways are allocated restoring a particular cache line. In the event that information in the store buffer becomes inaccurate, that information can be invalidated to prevent its use.

In one embodiment, the entry selection logic is operable to determine whether the associated cache information stored in any of the plurality of entries indicates a data value having the same address as the address of the request and to determine whether the data valid information for that entry indicates that the data value for that entry has not been written to the cache and, if so, to allocate that entry to store the request information.

Accordingly, in the event that a data value having the same address as a subsequent request is stored in the store buffer, then the data value stored in the store buffer may be overwritten with the new data value in the event that the data value currently stored in the store buffer has not yet been written to the cache. In other words, the new data value may be merged into the entry storing the previous data value. Again, it will be appreciated that by storing the new data value in this way, the cache information is retained and an unnecessary cache lookup is avoided for the new data value thereby reducing power and cache bandwidth consumption.

In one embodiment, the entry selection logic is operable to determine whether the associated cache information stored in any of the plurality of entries indicates that a cache line in one of the "n"-ways is currently allocated for writing the data value and to determine whether the data valid information for that entry indicates that the data value for that entry has been written to the cache and, if not, to allocate another of the plurality of entries to store the request information and to copy the associated cache information which indicates that a cache line in one of the "n"-ways is currently allocated for writing the data value from the entry to the another of the plurality of entries.

Accordingly, in the event that a subsequent request is received to write a data value which falls within the same cache line as a previous data yet to be written to the cache, but that previous data value has not yet been written by the store buffer to the cache, an entry in the store buffer will indicate the previous write request and also provide cache information indicating a cache way currently allocated to store the cache line which includes the data value to be written. Hence, although the data value in the current entry in the store buffer cannot be overwritten because the address of the previous data values and the current data values are different, the cache information for the current request will be the same because they fall within the same cache line. Accordingly, a new entry in the store buffer is allocated and the cache information is copied from the previous entry to the entry selected to store the write request. In this way, it can be seen that the cache information currently in the store buffer can be reused for the new write request thereby avoiding the need to perform a cache lookup which reduces power and cache bandwidth consumption.

In one embodiment, the store buffer further comprises hazard logic operable to determine whether the request is associated with an activity being performed by a bus interface unit.

In the event that the write request is to an address which is associated with an activity being performed by a bus interface unit, the hazard logic detects that there is a potential conflict between the store buffer and the bus interface unit.

In one embodiment, the hazard logic is operable to determine whether the activity is associated with a data value having the same address as the address of the request and, if so, to write the data value to the bus interface unit instead of the cache.

Accordingly, in the event that the addresses are the same, the store buffer will not write the data to the cache but will instead make the data value available to be written to the bus interface unit. This ensures that data values are not written to the cache and then overwritten by the bus interface unit thereby wasting further power.

In one embodiment, the entry selection logic is operable to store the request information and the associated cache information associated with the request in the allocated entry.

According to a second aspect of the present invention, there is provided a method comprising: a) receiving a request to write a data value to an address in memory; and b) determining, using request information and associated cache information of a plurality of entries of a buffer, which one of the plurality entries to allocate to store the request by determining whether a cache line in the cache is currently allocated for writing the data value to the address in memory, each entry selectively storing request information indicative of a previous request and maintaining associated cache information indicating whether a cache line in a cache is currently allocated for writing data values to an address associated with that request.

In embodiments, there is provided method steps corresponding to the functions performed by features of the first aspect.

According to a third aspect of the present invention, there is provided a data processing apparatus comprising: reception means for receiving a request to write a data value to an address in memory; buffer means including a plurality of entries, each entry selectively storing request information indicative of a previous request and maintaining associated cache information indicating whether a cache line in a cache is currently allocated for writing said data values to an address associated with that request; and entry selection means for determining which one of said plurality entries to allocate to store each request using said request information and said associated cache information of said plurality of entries in order to determine whether a cache line in said cache is currently allocated for writing said data value to said address in memory.

In embodiments, there is provided features corresponding to the features of the first aspect.

The above, and other objects, and features and advantages of this invention will be apparent from the following detailed description of illustrative embodiments which is to be read in conjunction with the accompanying drawings.

BRIEF DESCRIPTION OF THE DRAWINGS

Embodiments of the present invention will now be described with reference to the accompanying drawings in which.

DESCRIPTION OF THE EMBODIMENTS

Figure 1:
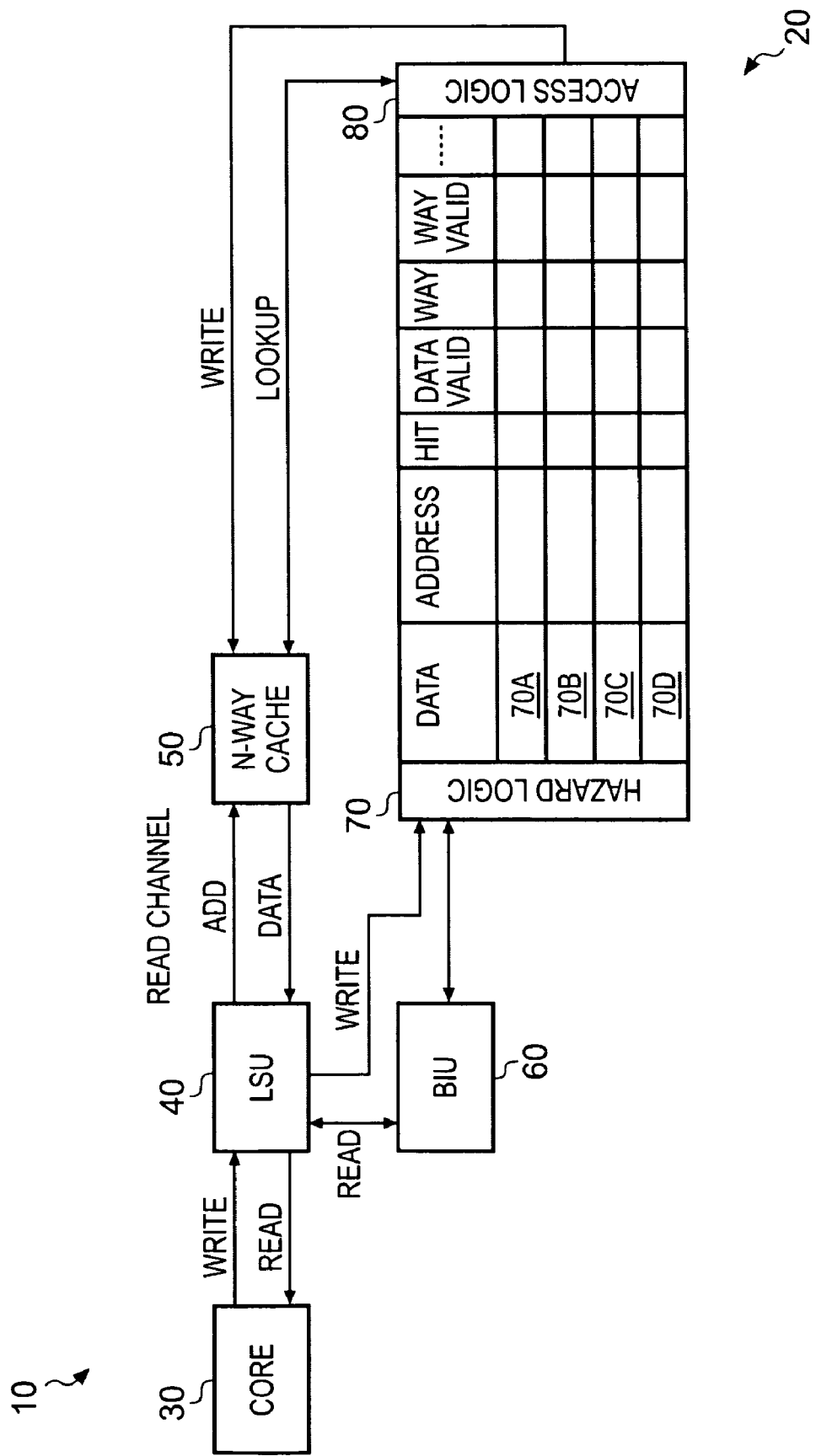
FIG. 1 illustrates a data processing apparatus incorporating a store buffer according to an embodiment of the present invention.

FIG. 1 illustrates a data processing apparatus, generally 10, incorporating a store buffer 20 according to one embodiment. The data processing apparatus 10 comprises a processor core 30 coupled with a load/store unit 40. The load/store unit 40 is coupled with a store buffer 20 and an n-way cache 50. The store buffer 20 is also coupled with the n-way cache 50 and a bus interface unit 60. In this example, the n-way cache is operable to store a cache line of 8 words in any of the n-ways at an index derived from the address associated with those words.

When the processor core 30 wishes to read a data value from a location in memory, a read request is issued by the processor core 30 to the load/store unit 40. The load/store unit 40 will determine whether the requested data value is stored in the n-way cache 50. In the event that the requested data value is stored in the n-way cache 50, a cache hit occurs and that data value is returned via the load/store unit 40 to the processor core 30. In the event that the requested data value is not stored in the n-way cache 50, a cache miss occurs and the load/store unit 40 will cause the bus interface unit 60 to retrieve the requested data value from a higher-level memory.

When the processor core 30 wishes to write a data value to memory, a write request is received by the load/store unit 40 from the processor core 30. The write request will typically contain one or more data values, together with an indication of the memory address or addresses associated with that or those data values. In this example, the data value comprises a double word.

The write request is provided from the load/store unit 40 to the store buffer 20. The store buffer 20 comprises hazard logic 70 which determines with reference to the bus interface unit 60 whether the write request received by the store buffer 20 is associated with an operation being performed by the bus interface unit 60. In the event that the hazard logic 70 determines that the write request is associated with an operation being performed by the bus interface unit 60, the write request will be prevented from being written to the cache 50 and instead will be made available to the bus interface unit 60. The store buffer 20 stores the write requests until those write requests can be written to the cache 50. Also, the hazard logic 70 constantly reviews the write requests stored in the store buffer 20 to determine whether the information stored therein remains valid, as will be explained in more detail below. Similarly, the hazard logic 70 constantly reviews the operation of the bus interface unit 60 and the cache 50 in order to determine whether it is still appropriate to complete the write requests and to store the data values in the cache 50.

The store buffer 20 also comprises access logic 80 operable to interface the store buffer 20 with the n-way cache 50. As will be explained in more detail below, the access logic 80 causes write operations to the cache 50 to take place in response to write requests. Also, the access logic 80 is operable, when required, to perform a cache lookup in order to determine cache attribute information for use during those write operations.

The store buffer 20 contains a number of entries 70a to 70d, each storing information relating to a write request. In this example, there are provided four entries. However, it will be appreciated that any number of entries may be provided within the store buffer 20. Each entry 70a to 70d contains a plurality of fields. Included within each entry are a number of fields relating to the write request, these fields include a data value field storing the data values to be stored in memory and an address field storing the address of those data values. Also included within each entry are a number of fields relating to cache information for those data values, these fields include a hit field providing an indication of whether a cache hit or miss has occurred for those data values, a data valid field providing an indication of whether or not the data stored in that entry is valid or not, a way field providing an indication of the way storing those data values and a way valid field providing an indication of whether the way information is valid or not. Other fields may be provided, these are not shown to improve clarity. As mentioned previously, the information stored by the fields relating to cache information may be reused for subsequent write requests in order to reduce the number of cache lookups which, in turn, saves power and reduces the amount of cache bandwidth used.

Figure 2:
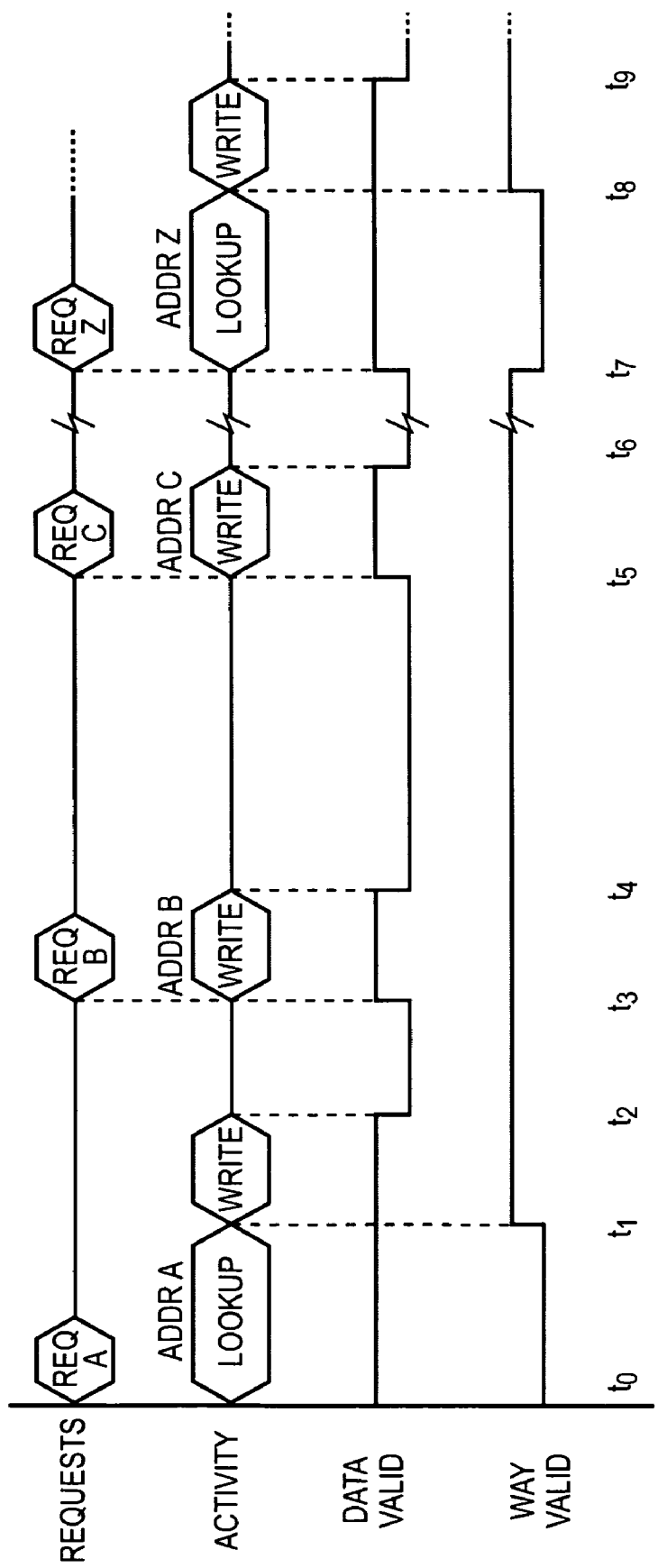
FIG. 2 illustrates an example operation of the store buffer illustrated in FIG. 1.

FIG. 2 illustrates an example operation of the store buffer 20 where three write requests all falling within the same cache line are received, followed by a further write request to different cache line.

At time t0, a write request A is received by the store buffer 20 to write data values at an address A to memory. The store buffer 20 determines whether any of the entries in the store buffer relate to the cache line which stores the data values associated with write request A. In this example, the store buffer 20 determines that no entry in the store buffer 20 relates to the cache line containing the data values the subject of write request A. Accordingly, the access logic 80 will perform a cache lookup to the n-way cache 50 and an invalid entry within the store buffer 20 is allocated to store the write request A. Once the write request A has been stored within an entry in the store buffer 20, the data valid field associated with that entry is asserted to indicate that the data values associated with that entry have yet to be written to memory.

Assuming that a cache line is currently allocated for storing the data values the subject of write request A, at time t1, the cache lookup completes and the access logic 80 returns a value indicating the cache way storing that cache line. This information is then written into the way field of the entry storing write request A and the way valid field is asserted to indicate that the value stored in the way field is valid. Also, the access logic 80 will perform a write request, requesting that the data values associated with the write request A be written to the n-way cache 50.

At time t2, the write operation to the n-way cache 50 completes. Accordingly, the data valid field associated with the entry storing write request A is cleared to indicate that the data values within that entry have been stored to memory. However, the way valid field remains asserted for as long as the way field information is correct for the cache line address stored within that entry. The hazard logic 70 will continue to monitor the information stored in each entry and in the event that this information is no longer valid, the way valid field will be cleared.

At time t3, a write request B is received to write data values to address B which falls within the same cache line as address A. Accordingly, the store buffer 20 will determine that an entry exists within the store buffer 20 which relates to the cache line which would contain the data values associated with request B. The store buffer 20 also determines that the data values stored in the entry have been written to memory and so may be overwritten because the data valid field for that entry has been cleared. Hence, the write request B can then overwrite the data and address fields of that entry in the store buffer 20. The data valid field is then asserted to indicate that the data value stored in that entry have yet to be written to memory. However, because the way valid field indicates that the way information of that entry is still valid no cache lookup needs to occur. Instead, the data values can be written directly to the 'n' way cache 50 using the information stored by the store buffer 20.

At time t4, the write operation completes and the data valid field associated with the entry storing request B is cleared to indicate that the data values have been written to memory.

At time t5, a write request C is received to write data values to address C which falls within the same cache line as addresses A and B. Accordingly, the store buffer 20 will determine that an entry exists within the store buffer 20 which relates to the cache line which would contain the data values associated with request C. The store buffer 20 also determines that the data values stored in the entry have been written to memory and so may be overwritten because the data valid field for that entry has been cleared. Hence, the write request C can then overwrite the data and address fields of that entry in the store buffer 20. The data valid field is then asserted to indicate that the data value stored in that entry have yet to be written to memory. However, because the way valid field indicates that the way information of that entry is still valid no cache lookup needs to occur. Instead, the data values can be written directly to the 'n' way cache 50 using the information stored by the store buffer 20.

At time t6, the write operation completes and the data valid field associated with the entry storing request C is cleared to indicate that the data values have been written to memory.

At time t7, a write request Z is received to write data values associated with address Z to memory. However, address Z does not fall within the same cache line as addresses A, B or C. Also, address Z does not fall within the cache lines associated with any of the other entries stored by the store buffer 20. Accordingly, an entry in the store buffer will need to be allocated to store the write request. Any entries for which the data valid field is asserted, indicating that those data values have yet to be written to memory, will not be allocated. Of any remaining entries for which the data valid field is clear, one of those entries is allocated on a round robin, pseudo random, least recently used or any other allocation policy. Once the write request Z has been stored within an entry in the store buffer 20, the data valid field associated with that entry is asserted to indicate that the data values associated with that entry have yet to be written to memory. The access logic 80 will perform a cache lookup to the n-way cache 50.

Assuming that a cache line is currently allocated for storing the data values the subject of write request Z, at time t8, the cache lookup completes and the access logic 80 returns a value indicating the cache way storing that cache line. This information is then written into the way field of the entry storing write request Z and the way valid field is asserted to indicate that the value stored in the way field is valid. Also, the access logic 80 will perform a write request, requesting that the data values associated with the write request Z be written to the n-way cache 50.

At time t9, the write operation to the n-way cache 50 completes. Accordingly, the data valid field associated with the entry storing write request Z is cleared to indicate that the data values within that entry have been stored to memory. However, the way valid field remains asserted for as long as the way field information is correct for the cache line address stored within that entry.

Hence, in this way, it can be seen that the information obtained by performing a cache lookup for one write request can be reused for further write requests, thereby obviating the need to perform a cache lookup every time. It will be appreciated that this reduces the power consumption caused by performing such cache lookups and also reduces the load on the cache bandwidth.

Figure 3:
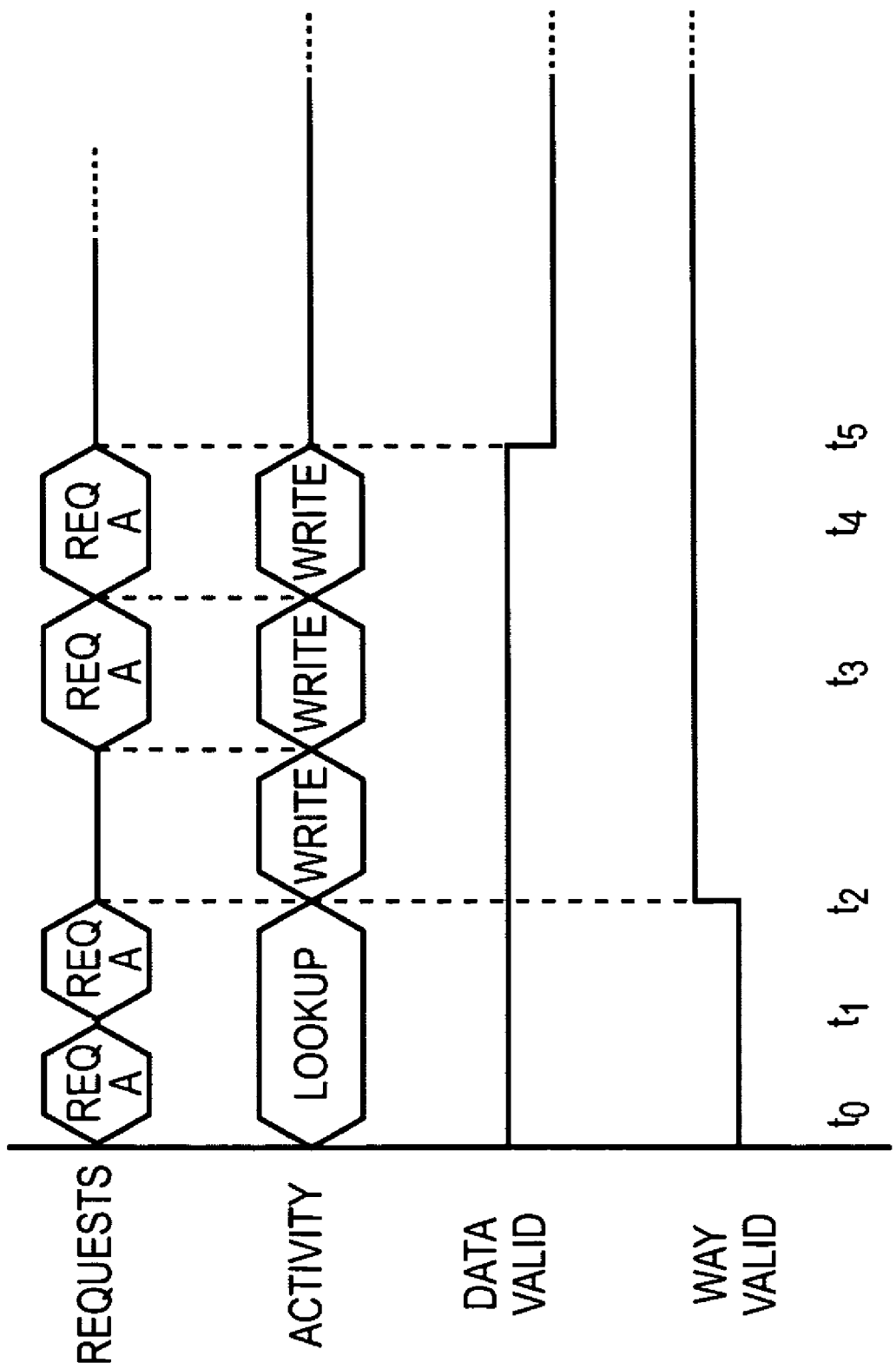
FIG. 3 illustrates another example operation of the store buffer illustrated in FIG. 1.

FIG. 3 illustrates an example operation of the store buffer 20 where four write requests all relating to the same address are received.

At time t0, a write request A is received by the store buffer 20 to write data values at an address A to memory. The store buffer 20 determines whether any of the entries in the store buffer relate to the cache line which stores the data values associated with write request A. In this example, the store buffer 20 determines that no entry in the store buffer 20 relates to the cache line containing the data values the subject of write request A. An invalid entry within the store buffer 20 is allocated to store the write request A and the data valid field associated with that entry is asserted to indicate that the data values associated with that entry have yet to be written to memory. Once the write request A has been stored within an entry in the store buffer 20 the access logic 80 will perform a cache lookup to the n-way cache 50.

However, at time t1, whilst the lookup operation is still occurring, a further write request A to perform a write operation to address A with updated data values is received by the store buffer 20. Accordingly, the store buffer 20 will determine that an entry within the store buffer 20 is currently allocated to store write request A. Although the data valid field indicates that those data values have yet to be written to memory, because the addresses are identical, it can be assumed that the later data values are to overwrite the existing data values stored by the store buffer 20. Hence, the later data values will overwrite the data values already stored in the store buffer 20 and the cache lookup is allowed to proceed uninterrupted.

Hence, at time t2, when the way information is received from the n-way cache 50, an indication of the cache way storing the cache line which includes the data values the subject of write request A is stored in the way field and the way valid field is asserted. The write request A for the later data values can then proceed.

At time t3, whilst the write operation is being performed, a further write request A is received with updated data values for address A. These also may overwrite the data values stored in the store buffer 20 because the data valid field is still asserted. Also, because the way valid field is still asserted, the write request is then made to the n-way cache 50 with the most recent data values.

Similarly, at time t4, whilst the write operation is being performed, a further write request A is received with updated data values for address A. These also may overwrite the data values stored in the store buffer 20 because the data valid field is still asserted. Also, because the way valid field is still asserted, the write request is then made to the n-way cache 50 with the most recent data values.

At time t5 the write request completes, the data valid field is cleared to indicate that the data values stored in the store buffer 20 had been written to memory. However, the way valid field remains asserted to indicate that the way information is still valid.

Accordingly, it can be seen that when multiple write requests occur to the same address, not all of those write requests need to be performed and instead the data values may simply be overwritten within the store buffer 20, also, a cache lookup need not occur for each of those write requests since information associated with a previous cache lookup may be reused for subsequent write requests. It will be appreciated that this reduces power consumption.

Figure 4:
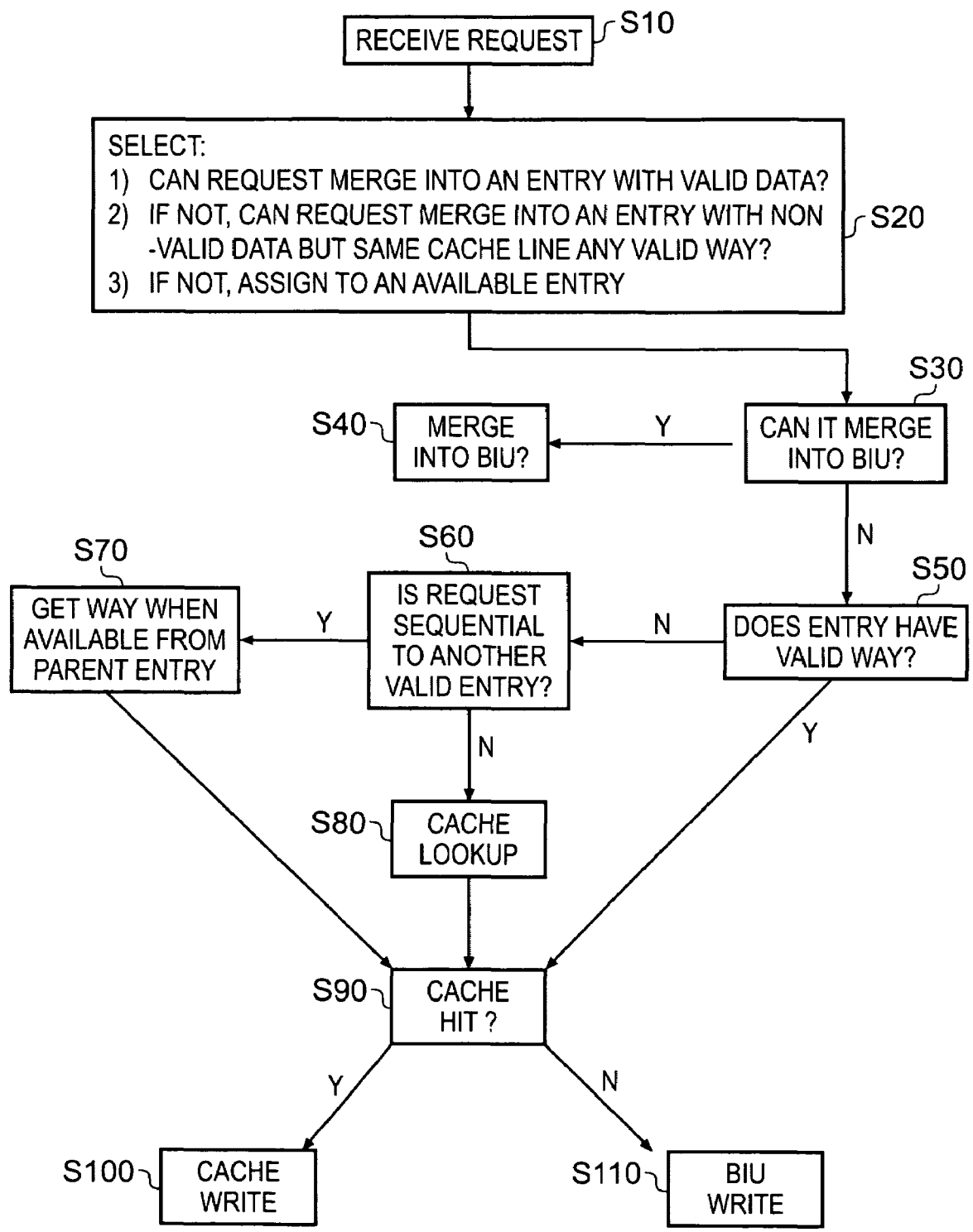
FIG. 4 is a flow chart showing in more detail the processing steps of the store buffer shown in FIG. 1.

FIG. 4 illustrates in more detail the processing steps of the store buffer 20.

At step S10, the store buffer 20 receives a write request.

At step S20, the store buffer 20 selects an entry to store that write request based on a predetermined selection criteria. Firstly, a determination is made whether or not the write request can merge into an entry relating to a previous write request to the same address but for which the data valid field is asserted, indicating that the data values stored therein have yet to be written to memory. If such an entry is available, then that entry is selected and the data values in that entry are overwritten with the new data values and processing proceeds to step S30. If such an entry does not exist, then a determination is made whether the write request can merge into an entry relating to the same cache line which has valid way information but for which the data values in that entry have been written to memory. If such an entry exists then that entry is allocated, the data values and address associated with the request is written therein and processing proceeds to step S30. Otherwise, if no such entry exist, then one of any remaining entries are allocated in accordance with a predetermined allocation scheme and processing proceeds to step S30.

At step S30, the hazard logic 70 determines whether the write request is associated with any operations being performed by the bus interface unit 60. If the hazard logic determines that such a condition exists, then the write request is passed to the bus interface unit at step S40 for handling. If at step S30, it is determined that there is no conflict with the bus interface unit 60, then processing proceeds to step S50.

At step S50, it is determined whether the valid way field for the allocated entry is asserted or not. If the way field is asserted then processing proceeds to step S90. If the way field is not asserted then processing proceeds to step S60.

At step S60, it is determined whether the request is sequential to a request in another allocated entry for which the way field is valid. In other words, a determination is made as to whether an entry within the store buffer 20 contains a write request for the same cache line as the present request and for which that other write request has valid way information.

If it is determined that the request is sequential to another request stored by the store buffer, then at step S70, the way field from that slot is copied to the slot for the present request and the way valid field of that entry is asserted and processing proceeds to step S90.

If, it is determined that the request is not sequential to a previous request stored by the store buffer then, at step S80 a cache lookup is performed. Thereafter, the processing proceeds to step S90.

At step S90, it is determined whether a cache hit within the n-way cache 50 occurs.

If a cache hit occurs then the hit field associated with the entry storing the write request is asserted to indicate that a cache hit has occurred and the access logic 80 responds by causing a write operation to occur to the n-way cache 50 at step S100.

If a cache miss occurs, then at step S110, the write request is passed to the bus interface unit 60 to perform a write operation.

Accordingly, it can be seen from FIG. 4 the need to perform a cache lookup is bypassed where cache information relating to a write request is contained in the store buffer 20. Bypassing the cache lookup helps to reduce power consumption and reduces the cache bandwidth used unnecessarily.

Hence, by reviewing the entries in the buffer logic and identifying which entry to store the request based on information currently stored by the buffer logic, the need to perform a cache lookup to obtain cache information indicating whether any cache line in a cache is currently allocated for writing the data value may be obviated. Obviating the need to perform a cache lookup helps to reduce the power consumption of the store buffer. Also, the amount of cache bandwidth consumed by performing unnecessary cache lookups may also be reduced, thereby significantly improving the performance of the cache.

Although illustrative embodiments of the invention have been described in detail herein with reference to the accompanying drawings, it is to be understood that the invention is not limited to those precise embodiments, and that various changes and modifications can be affected therein by one skilled in the art without departing from the scope and spirit of the invention as defined by the appended claims.

We claim:

1. A store buffer comprising:
    reception logic operable to receive a present request to write a data value to an address in memory;
    buffer logic having a plurality of entries, each entry being selectively configured to store request information indicative of a previous request and to maintain associated cache information indicating whether a cache line in a cache is currently allocated for writing data values to an address associated with that previous request, said associated cache information being maintained after the data value associated with said previous request has been written to said cache; and
    entry selection logic for determining which one of said plurality of entries to allocate to store said present request using said request information indicative of a previous request and said associated cache information of said plurality of entries to determine whether a cache line in said cache is currently allocated for writing said data value associated with said present request to said address in memory.

2. The store buffer as claimed in claim 1, wherein said associated cache information comprises an address indicative of said cache line currently allocated in said cache.

3. The store buffer as claimed in claim 1, wherein said cache comprises an "n"-way set-associative cache, where "n" is an integer greater than 1, and said associated cache information further comprises an indication of which of the "n"-ways is currently allocated for writing said data value.

4. The store buffer as claimed in claim 3, wherein each entry is further configured to store data valid information indicating whether said data value for that entry has been written to said cache.

5. The store buffer as claimed in claim 4, wherein said entry selection logic is configured to determine whether said associated cache information stored in any of said plurality of entries indicates that a cache line in one of said "n"-ways is currently allocated for writing said data value and to determine whether said data valid information for that entry indicates that said data value for that entry has been written to said cache and, if so, to allocate that entry to store request information for said present request.

6. The store buffer as claimed in claim 5, wherein said buffer logic is configured to retain said associated cache information stored in each of said plurality of entries indicating that a cache line in one of said "n"-ways is currently allocated for writing data values even when said data valid information has been set to indicate that said data value for that entry has been written to said cache.

7. The store buffer as claimed in claim 5, further comprising hazard detection logic for determining whether said associated cache information stored in each of said plurality of entries indicates that a cache line in one of said "n"-ways is currently allocated for writing data values remains valid and, if not, to invalidate said associated cache information stored in that entry to indicate that a cache line in one of said "n"-ways is not currently allocated for writing data values.

8. The store buffer as claimed in claim 4, wherein said entry selection logic is configured to determine whether said associated cache information stored in any of said plurality of entries indicates a data value having the same address as said address of said request and to determine whether said data valid information for that entry indicates that said data value for that entry has not been written to said cache and, if so, to allocate that entry to store request information for said present request.

9. The store buffer as claimed in claim 4, wherein said entry selection logic is configured to determine whether said associated cache information stored in any of said plurality of entries indicates that a cache line in one of said "n"-ways is currently allocated for writing said data value and to determine whether said data valid information for that entry indicates that said data value for that entry has been written to said cache and, if not, to allocate another of said plurality of entries to store request information for said present request and to copy said associated cache information which indicates that a cache line in one of said "n"-ways is currently allocated for writing said data value from said entry to said another of said plurality of entries.

10. The store buffer as claimed in claim 1, further comprising hazard logic for determining whether said present request is associated with an activity being performed by a bus interface unit.

11. The store buffer as claimed in claim 10, wherein said hazard logic is configured to determine whether said activity is associated with a data value having the same address as said address of said present request and, if so, to write said data value to said bus interface unit instead of said cache.

12. The store buffer as claimed in claim 1, wherein said entry selection logic is configured to store request information and said associated cache information associated with said present request in said allocated entry.

13. A method comprising:
a) receiving a present request to write a data value to an address in memory; and
b) determining, using request information indicative of a previous request and associated cache information of a plurality of entries of a buffer, which one of said plurality of entries to allocate to store said present request by determining whether a cache line in said cache is currently allocated for writing said data value associated with said present request to said address in memory, each entry selectively storing request information indicative of a previous request and maintaining associated cache information indicating whether a cache line in a cache is currently allocated for writing data values to an address associated with that previous request, said associated cache information being maintained after the data value associated with said previous request has been written to said cache.

14. The method as claimed in claim 13, wherein said associated cache information comprises an address indicative of said cache line currently allocated in said cache.

15. The method as claimed in claim 13, wherein said cache comprises an "n"-way set-associative cache, where "n" is an integer greater than 1, and said associated cache information further comprises an indication of which of the "n"-ways is currently allocated for writing said data value.

16. The method as claimed in claim 15, wherein each entry is further operable to store data valid information indicating whether said data value for that entry has been written to said cache.

17. The method as claimed in claim 16, wherein said step b) comprises:
determining whether said associated cache information stored in any of said plurality of entries indicates that a cache line in one of said "n"-ways is currently allocated for writing said data value and determining whether said data valid information for that entry indicates that said data value for that entry has been written to said cache and, if so, allocating that entry to store request information for said present request.

18. The method as claimed in claim 17, further comprising the step of:
retaining said associated cache information stored in each of said plurality of entries indicating that a cache line in one of said "n"-ways is currently allocated for writing data values even when said data valid information has been set to indicate that said data value for that entry has been written to said cache.

19. The method as claimed in claim 16, wherein said step b) comprises:
determining whether said associated cache information stored in any of said plurality of entries indicates a data value having the same address as said address of said present request and determining whether said data valid information for that entry indicates that said data value for that entry has not been written to said cache and, if so, allocating that entry to store request information for said present request.

20. The method as claimed in claim 16, wherein said step b) comprises:
determining whether said associated cache information stored in any of said plurality of entries indicates that a cache line in one of said "n"-ways is currently allocated for writing said data value and determining whether said data valid information for that entry indicates that said data value for that entry has been written to said cache and, if not, allocating another of said plurality of entries to store said request information for said present request and copying said associated cache information which indicates that a cache line in one of said "n"-ways is currently allocated for writing said data value from said entry to said another of said plurality of entries.

21. The method as claimed in claim 13, comprising the step of: storing request information and said associated cache information associated with said present request in said allocated entry.

22. A data processing apparatus comprising:

reception means for receiving a present request to write a data value to an address in memory;

buffer means including a plurality of entries, each entry selectively storing request information indicative of a previous request and maintaining associated cache information indicating whether a cache line in a cache is currently allocated for writing data values to an address associated with that previous request, said associated cache information being maintained after the data value associated with said previous request has been written to said cache; and entry selection means for determining which one of said plurality of entries to allocate to store said present request using said request information indicative of a previous request and said associated cache information of said plurality of entries in order to determine whether a cache line in said cache is currently allocated for writing said data value associated with said present request to said address in memory.

* * * * *